(12) United States Patent
Wang et al.

(10) Patent No.: US 10,037,070 B2
(45) Date of Patent: Jul. 31, 2018

(54) IMAGE DISPLAY METHOD AND DISPLAY SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Di Wang, Beijing (CN); Hao Zhang, Beijing (CN); Lingyun Shi, Beijing (CN); Jialong Li, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/105,144

(22) PCT Filed: Jan. 5, 2016

(86) PCT No.: PCT/CN2016/070102
§ 371 (c)(1),
(2) Date: Jun. 16, 2016

(87) PCT Pub. No.: WO2017/008474
PCT Pub. Date: Jan. 19, 2017

(65) Prior Publication Data
US 2017/0199563 A1 Jul. 13, 2017

(30) Foreign Application Priority Data
Jul. 15, 2015 (CN) .......................... 2015 1 0415988

(51) Int. Cl.
*G06F 15/00* (2006.01)
*G06T 1/00* (2006.01)
(Continued)

(52) U.S. Cl.
CPC ............ *G06F 1/3265* (2013.01); *G06F 1/324* (2013.01); *G06T 1/20* (2013.01); *G06F 3/14* (2013.01);
(Continued)

(58) Field of Classification Search
CPC .......... G06F 1/3265; G06F 1/324; G06F 3/14; G06T 1/20; G06T 15/005; G06T 1/60; G09G 5/363
See application file for complete search history.

(56) References Cited

U.S. PATENT DOCUMENTS

| 5,898,870 A * | 4/1999 | Okuda .................... G06F 9/505 718/104 |
| 8,972,760 B1 | 3/2015 | Zajac |

(Continued)

FOREIGN PATENT DOCUMENTS

| CN | 101281639 A | 10/2008 |
| CN | 101571743 A | 11/2009 |

(Continued)

OTHER PUBLICATIONS

Form PCT/SA/210 issued in corresponding international application No. PCT/CN2016/070102 dated Apr. 19, 2016.
(Continued)

*Primary Examiner* — Abderrahim Merouan
(74) *Attorney, Agent, or Firm* — Nath, Goldberg & Meyer; Joshua B. Goldberg

(57) ABSTRACT

The present invention provides an image display method and a display system, belongs to the field of display technology, and can solve the problem of large power consumption in an
(Continued)

existing image display method when displaying images. The image display method of the present invention comprises: determining a utilization ratio of a CPU according to a pre-acquired working parameter of the CPU to a determined result; adjusting a processing frequency of a GPU according to the determined result; and adjusting a resolution of displayed images according to the adjusted processing frequency of the GPU so as to display images.

7 Claims, 3 Drawing Sheets

(51) Int. Cl.
| | | |
|---|---|---|
| *G06F 1/32* | (2006.01) | |
| *G06T 1/20* | (2006.01) | |
| *G06T 1/60* | (2006.01) | |
| *G06F 3/14* | (2006.01) | |
| *G09G 5/36* | (2006.01) | |
| *G06T 15/00* | (2011.01) | |

(52) U.S. Cl.
CPC .............. *G06T 1/60* (2013.01); *G06T 15/005* (2013.01); *G09G 5/363* (2013.01)

(56) References Cited

U.S. PATENT DOCUMENTS

| | | | | |
|---|---|---|---|---|
| 9,348,393 | B1* | 5/2016 | Jane | G06F 1/26 |
| 9,494,994 | B1* | 11/2016 | Law | G06F 1/3206 |
| 2003/0156188 | A1* | 8/2003 | Abrams, Jr. | H04N 13/0037 |
| | | | | 348/51 |
| 2006/0114275 | A1* | 6/2006 | Kim | G09G 5/005 |
| | | | | 345/698 |
| 2007/0049133 | A1* | 3/2007 | Conroy | G06F 1/26 |
| | | | | 439/894 |
| 2009/0225090 | A1* | 9/2009 | Chiu | G09G 5/363 |
| | | | | 345/520 |
| 2011/0128889 | A1* | 6/2011 | Liao | H04L 41/0893 |
| | | | | 370/255 |
| 2011/0216078 | A1 | 9/2011 | Blinzer | |
| 2012/0076001 | A1* | 3/2012 | Saitou | H04L 43/103 |
| | | | | 370/241 |
| 2012/0108908 | A1* | 5/2012 | Ellingson | A61N 1/3704 |
| | | | | 600/300 |
| 2012/0169746 | A1 | 7/2012 | Samson | |
| 2012/0179938 | A1* | 7/2012 | Nijhawan | G06F 1/3206 |
| | | | | 714/47.2 |
| 2012/0233488 | A1* | 9/2012 | Burchard | G06F 1/3228 |
| | | | | 713/500 |
| 2012/0324248 | A1* | 12/2012 | Schluessler | G06F 1/3253 |
| | | | | 713/300 |
| 2013/0097443 | A1* | 4/2013 | Li | G06F 1/3206 |
| | | | | 713/322 |
| 2014/0047256 | A1* | 2/2014 | Li | G06F 1/3287 |
| | | | | 713/323 |
| 2014/0267101 | A1* | 9/2014 | Iwaki | G06F 3/048 |
| | | | | 345/173 |
| 2015/0007356 | A1* | 1/2015 | Hauke | G06F 21/81 |
| | | | | 726/36 |
| 2015/0015589 | A1* | 1/2015 | Chung | G06F 1/324 |
| | | | | 345/501 |
| 2015/0052536 | A1* | 2/2015 | Sah | G06F 9/5083 |
| | | | | 718/105 |
| 2015/0141035 | A1* | 5/2015 | Chen | H04W 64/00 |
| | | | | 455/456.1 |
| 2015/0181531 | A1* | 6/2015 | Zajac | G06F 1/3212 |
| | | | | 455/574 |
| 2015/0261284 | A1* | 9/2015 | Lee | G06F 1/3234 |
| | | | | 713/323 |
| 2016/0063301 | A1* | 3/2016 | Wu | G06K 9/00033 |
| | | | | 382/124 |
| 2016/0077565 | A1* | 3/2016 | Jayaseelan | G06F 9/546 |
| | | | | 713/340 |
| 2016/0098334 | A1* | 4/2016 | Hariharakrishnan | G06F 11/3013 |
| | | | | 702/186 |
| 2016/0154444 | A1* | 6/2016 | Liu | G05D 23/1917 |
| | | | | 700/299 |

FOREIGN PATENT DOCUMENTS

| | | | |
|---|---|---|---|
| CN | 101742154 | A | 6/2010 |
| CN | 101256762 | B * | 8/2010 |
| CN | 102819313 | A | 12/2012 |
| CN | 103312901 | A | 9/2013 |
| CN | 103631359 | A | 3/2014 |
| CN | 104024979 | A | 9/2014 |
| CN | 104243720 | A | 12/2014 |
| CN | 104932659 | A | 9/2015 |

OTHER PUBLICATIONS

Form PCT/SA/220 issued in corresponding international application No. PCT/CN2016/070102 dated Apr. 19, 2016.
Form PCT/SA/237 issued in corresponding international application No. PCT/CN2016/070102 dated Apr. 19, 2016.
First Office Action dated Mar. 8, 2017 corresponding to Chinese application No. 201510415988.2.

* cited by examiner

IMAGE DISPLAY METHOD AND DISPLAY SYSTEM

This is a National Phase Application filed under 35 U.S.C. 371 as a national stage of PCT/CN2016/070102, filed Jan. 5, 2016, an application claiming the benefit of Chinese Application No. 201510415988.2, filed Jul. 15, 2015, the content of each of which is hereby incorporated by reference in its entirety.

FIELD OF THE INVENTION

The present invention belongs to the field of display technology, in particular relates to an image display method and an image display system.

BACKGROUND OF THE INVENTION

At present, with the development of mobile industry, the development of CPU (Central Processing Unit), the "heart" of a display terminal, tends to be smooth, and with the increase of applications, the requirement for the performance of the display terminal becomes higher and higher. Multi-functional applications further cause an increase in the power consumption of the display terminal and a reduction in battery life. The problem of power consumption and performance requirements has become one of the basic problems with most concerns in the current field of mobile terminals.

The inventors of the present invention found that in the prior art, regardless of the utilization ratio of a CPU of the display terminal, the processing frequency of a GPU (Graphics Processing Unit) thereof is a fixed value. Therefore, there are two problems: (1) if the utilization ratio of the CPU is low, the data center reads that the user is at a static state (i.e. at a mode of viewing pictures or browsing the Web) at present, then the operational processing frequency of the GPU is relatively high; in this case, for the user, the purpose of improving performance is not achieved, but energy is wasted; (2) if the utilization ratio of the CPU is high, the data center reads that the user is playing a 3D online game at present, then the operational processing frequency of the GPU is relatively low, so the image processing capability of the GPU is low, which may cause the problems of not smooth image display on the mobile phone and slow image processing.

In summary, it is an urgent technical problem to be solved how to make CPU and GPU operate cooperatively to reduce power consumption of the display without wasting resources.

SUMMARY OF THE INVENTION

One of the objectives of the present invention is to provide an image display method which can reduce power consumption of a display and an image display system so as to solve the above problems existing in current image display methods.

One of the technical solutions of the present invention is an image display method, comprising:
determining a utilization ratio of a CPU according to a pre-acquired working parameter of the CPU to obtain a determined result;
adjusting a processing frequency of a GPU according to the determined result; and
adjusting a resolution of displayed images according to the adjusted processing frequency of the GPU so as to display images.

Preferably, the working parameter of the CPU comprises a working frequency.

Further preferably, before acquiring the working parameter of the CPU, the image display method further comprises:
setting a dominant frequency for the GPU.

Further preferably, adjusting the processing frequency of the GPU according to the determined result comprises:
when it is determined that the utilization ratio of the CPU is less than or equal to 30%, adjusting the processing frequency of the GPU to be smaller than the dominant frequency;
when it is determined that the utilization ratio of the CPU is greater than or equal to 70%, adjusting the processing frequency of the GPU to be larger than the dominant frequency; and
when it is determined that the utilization ratio of the CPU is between 30% and 70%, keeping the processing frequency of the GPU at the dominant frequency.

Further preferably, adjusting the resolution of the displayed images according to the adjusted processing frequency of the GPU comprises:
when the processing frequency of the GPU equals to the dominant frequency, keeping the resolution of the displayed images at an initial resolution;
when the processing frequency of the GPU is smaller than the dominant frequency, adjusting the resolution of the displayed images to be smaller than the initial resolution; and
when the processing frequency of the GPU is larger than the dominant frequency, keeping the resolution of the displayed images at the initial resolution.

Another technical solution of the present invention is an image display system, comprising:
a determination unit used for determining a utilization ratio of a CPU according to a pre-acquired working parameter of the CPU to obtain a determined result;
a processing frequency adjustment unit used for adjusting a processing frequency of a GPU according to the determined result of the determination unit; and
a resolution adjustment unit used for adjusting a resolution of displayed images according to the adjusted processing frequency of the GPU.

Preferably, the working parameter of the CPU comprises a working frequency.

Preferably, the image display system further comprises a clock unit used for setting a dominant frequency for the GPU.

Preferably, the image display system further comprises a display unit used for displaying images according to the resolution adjusted by the resolution adjustment unit.

The present invention has the following beneficial effects.

According to the image display method of the present invention, a processing frequency of a GPU is adjusted according to a determined utilization ratio of a CPU, to control the transmission speed of image display data and adjust a resolution of displayed images, so that the images are displayed in a different resolution when the display system is in a different operation mode. Therefore, the dynamic power consumption of the GPU is reduced, and the overall power consumption of the display system is also lowered.

DETAILED DESCRIPTION OF THE EMBODIMENTS

To make those skilled in the art better understand the technical solutions of the present invention, the present invention will be further described below in detail with reference to the accompanying drawings and specific implementations.

First Embodiment

Figure 1:
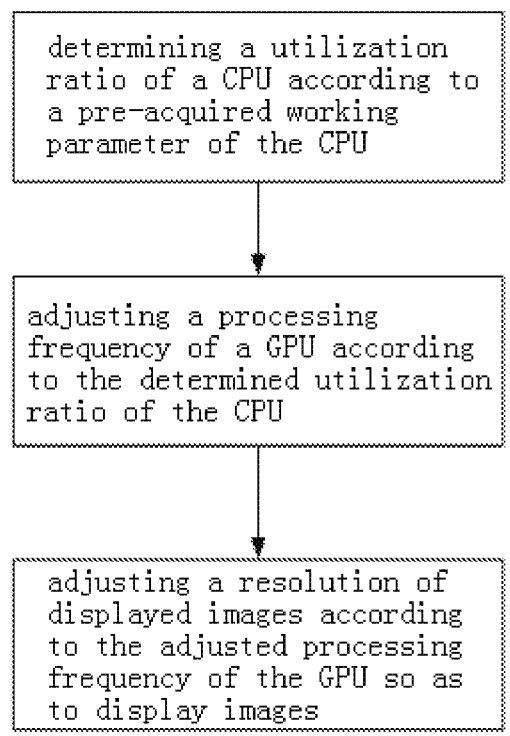
FIG. 1 is a flow diagram of an image display method according to a first embodiment of the present invention.

As shown in FIG. 1, this embodiment provides an image display method, comprising the following steps:

determining a utilization ratio of a CPU according to a pre-acquired working parameter of the CPU to obtain a determined result;

adjusting a processing frequency of a GPU according to the determined utilization ratio of the CPU; and adjusting a resolution of displayed images according to the adjusted processing frequency of the GPU, so as to display images.

According to the image display method of this embodiment, the processing frequency of the GPU is adjusted according to the determined utilization ratio of the CPU so as to control the transmission speed of image display data, and then the resolution of displayed images is adjusted according to the adjusted processing frequency of the GPU, so that the images are displayed by the display in a different resolution when the display is in a different operation mode. In this way, the dynamic power consumption of the GPU is reduced, and further, the overall power consumption of the display is also lowered. The specific display method will be described with reference to the following embodiment.

Second Embodiment

Figure 2:
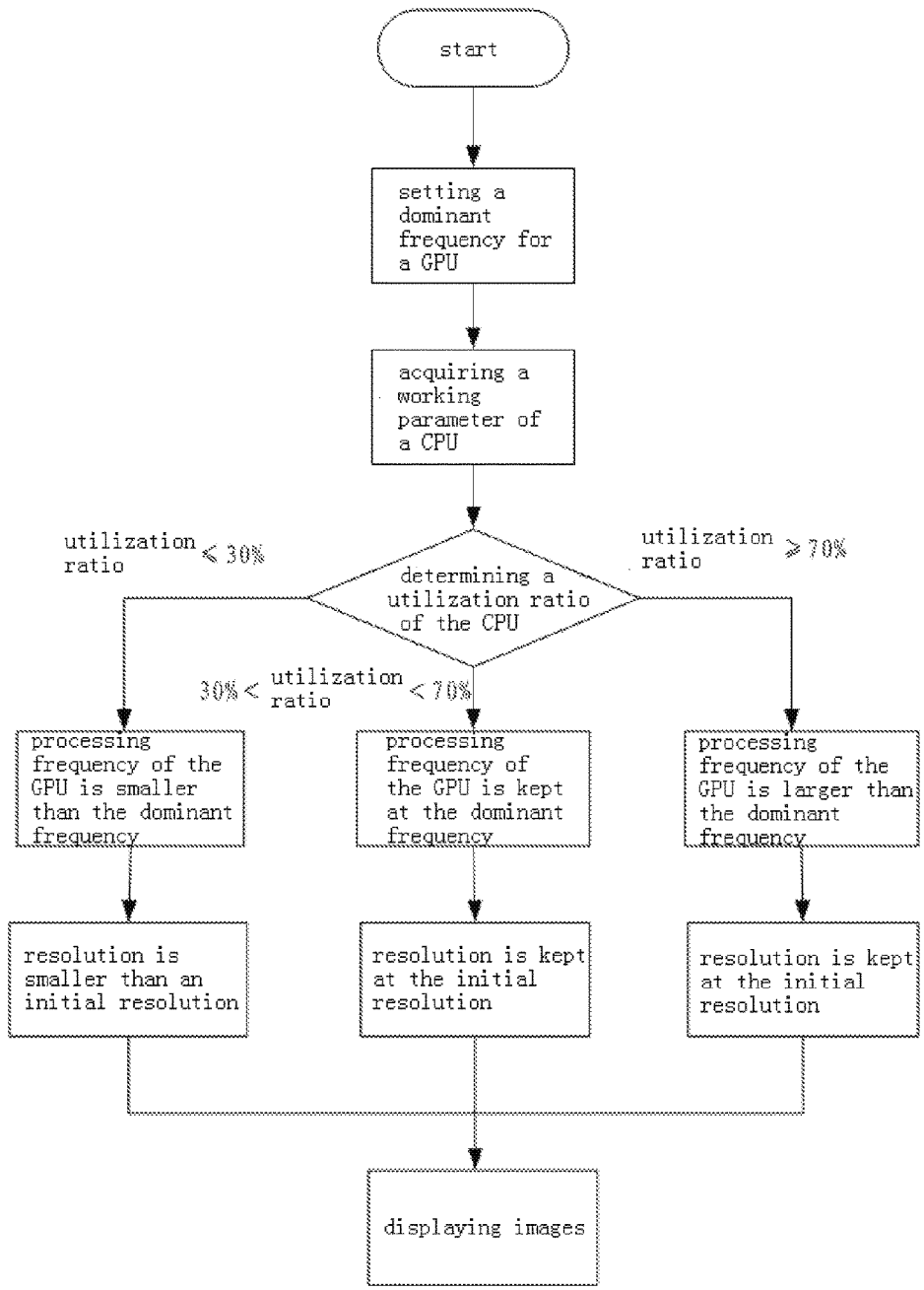
FIG. 2 is a flow diagram of an image display method according to a second embodiment of the present invention.

As shown in FIG. 2, this embodiment provides an image display method, which specifically comprises the following steps 1-6:

Step 1: setting a dominant frequency for a GPU of a display, that is, setting a reference processing frequency for the GPU.

Specifically, the display may comprise a clock unit, and the clock unit may provide the dominant frequency for the GPU.

Step 2: acquiring a working parameter of a CPU of the display, wherein, the working parameter of the CPU may comprise working frequency.

Step 3: determining a utilization ratio of the CPU according to the working parameter of the CPU acquired in step 2.

In step 3, the current state of the display used by a user can be read according to the determined utilization ratio of the CPU. Specifically, when it is determined that the utilization ratio of the CPU is less than or equal to 30%, the display is at a static state at present, for example, in an electronic book reading or Web browsing mode; when it is determined that the utilization ratio of the CPU is between 30% and 70%, the display is for example in an audio mode at present, for example, in a music playing mode or a general video playing mode; when it is determined that the utilization ratio of the CPU is greater than or equal to 70%, the display is at a high speed processing state at present, for example, in a 3D game mode or a ultra high-definition video displaying mode.

Step 4, adjusting a processing frequency of the GPU according to the utilization ratio of the CPU determined in step 3. This embodiment takes an initial image resolution of 1080*1920, which is the mainstream full high definition (FHD) resolution at present, and the transmission mode of MIPI (Mobile Industry Processor Interface) 4 lane as an example, wherein an MIPI data transmission speed of modules and a driver IC provided by the display is 850 bps, and an STY frame frequency is 60 Hz. Meanwhile, it is assumed that a lowest processing frequency of the CPU is 200 Hz, the dominant frequency (reference processing frequency) of the GPU is 350 Hz and a highest processing frequency of the GPU is 500 Hz.

When it is determined that the utilization ratio of the CPU is less than or equal to 30%, the processing frequency of the CPU is adjusted to be smaller than the dominant frequency. Specifically, when the utilization ratio of the CPU is less than or equal to 30%, the display is at a static state at this point, so the processing frequency of the GPU may be reduced, that is, the processing frequency of the GPU is switched to be smaller than the dominant frequency. For example, the processing frequency of the GPU may be switched to the lowest processing frequency of 20011 Hz, the MIPI Data transmission speed is reduced to 500 bps, and at this time, the image resolution can be adjusted to high definition (HD), the STY frame frequency is 60 Hz (60 Hz can just meet the requirements for human eyes to identify the image switching speed), so that the power consumption is reduced and resource waste is avoided under the condition of satisfying the user's experience degree.

When it is determined that the utilization ratio of the CPU is greater than or equal to 70%, the processing frequency of the GPU is adjusted to be larger than the dominant frequency. Specifically, when the utilization ratio of the CPU is greater than or equal to 70%, the display is at a high speed processing state (such as in a 3D game mode) at this point, and then the processing frequency of the GPU may be enhanced, that is, the processing frequency of the GPU may be switched to a high frequency. For example, the processing frequency of the GPU may be switched to the highest processing frequency of 500 Hz, because at this time, the load of GPU increases, and it is necessary to enhance the processing frequency of the GPU and the image processing speed of the GPU, so as to increase smoothness of displaying images and improve user's satisfaction degree.

When it is determined that the utilization ratio of the CPU is between 30% and 70%, the processing frequency of the GPU is kept at the dominant frequency. Specifically, when the utilization ratio of the CPU is between 30% and 70%, the display is for example in an audio mode at this point, then the processing frequency of the GPU may be kept at the dominant frequency, that is, the processing frequency of the GPU is 350 Hz, the MIPI Data transmission speed is 850 bps, the STV frame frequency is 60 Hz, and at this time, the power consumption of the display is at a normal level.

Step 5, adjusting a resolution of displayed images according to the adjusted processing frequency of the GPU in step 4.

When the processing frequency of the GPU equals to the dominant frequency, the resolution of the displayed images is kept at an initial resolution, i.e., the full high definition (HID) resolution of 1080*1920. Specifically, when the display is in an audio mode, the processing frequency of the GPU is kept at the dominant frequency, that is, the processing frequency of the GPU is 350 Hz, the image resolution is the full high definition resolution, and at this time, the power consumption of the display is at a normal level.

When the processing frequency of the GPU is smaller than the dominant frequency, the resolution of the displayed images is adjusted to be smaller than the initial resolution. Specifically, when the display is at a static state, the processing frequency of the GPU may be reduced and switched to be smaller than the dominant frequency, for example, the processing frequency of the GPU may be switched to the lowest processing frequency of 200 Hz, and at this time, the image resolution is adjusted to high definition (HD), so that the power consumption is reduced under the condition of satisfying user's experience degree.

When the processing frequency of the GPU is larger than the dominant frequency, the resolution of the displayed images is kept at the initial resolution, i.e., the full high definition (FHD) resolution of 1080*1920. Specifically, when the display is at a high speed processing state (such as in a 3D game mode), the processing frequency of the GPU may be enhanced and switched to a high frequency, for example, the processing frequency of the GPU may be switched to the highest processing frequency of 500 Hz, because at this time, the load of GPU increases, and it is necessary to enhance the processing frequency of the GPU and the image processing speed of the GPU, so as to maintain resolution of the displayed images, increase smoothness of displaying images and improve user's satisfaction degree.

Step 6, displaying the images according to the adjusted resolution in step 5.

In summary, the processing frequency of the GPU is adjusted according to the determined utilization ratio of the CPU so as to control the transmission speed of image display data, then the resolution of displayed images is adjusted according to the adjusted processing frequency of the GPU, so that the images are displayed in a different resolution when the display is in a different operation mode. Based on the formula of $P=CV^2f$ (where, P is the dynamic power consumption of the GPU, C is the load capacitance, V is the operating voltage and f is the processing frequency of the GPU), it can be obtained that the image display method of this embodiment can effectively reduce the dynamic power consumption of the GPU, so that the overall power consumption of the display is reduced.

Third Embodiment

Figure 3:
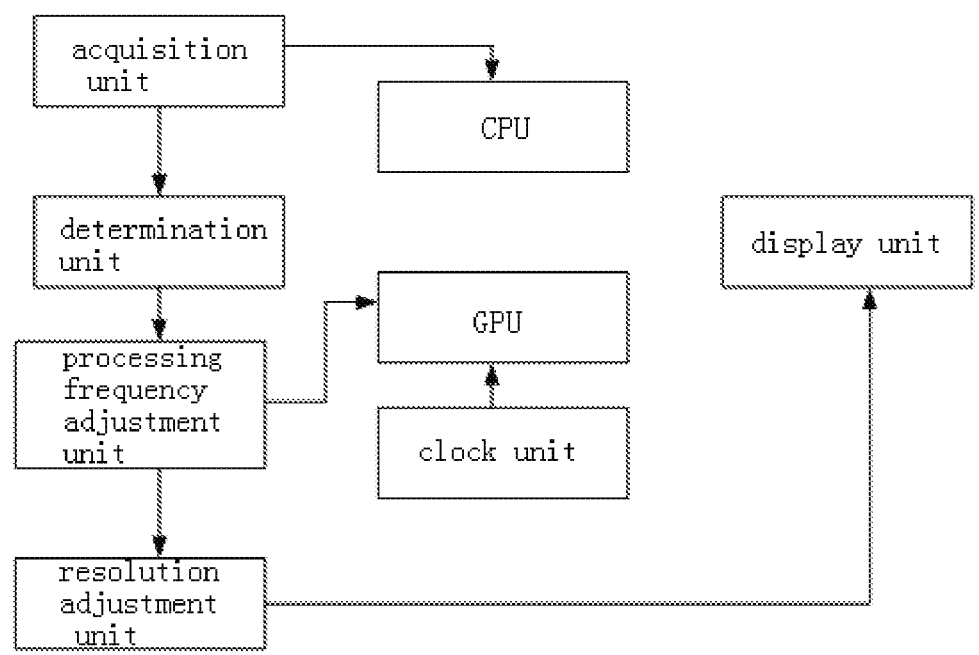
FIG. 3 is a schematic diagram of a display system according to a third embodiment of the present invention.

As shown in FIG. 3, this embodiment provides a display system which displays images using the display method in the first embodiment or the second embodiment. The display system specifically comprises a determination unit, a processing frequency adjustment unit and a resolution adjustment unit, wherein the determination unit is used for determining a utilization ratio of a CPU according to pre-acquired working parameter of the CPU to obtain a determined result; the processing frequency adjustment unit is used for adjusting a processing frequency of a GPU according to the determined result of the determination unit; and the resolution adjustment unit is used for adjusting a resolution of displayed images according to the adjusted processing frequency of the GPU.

In the display system of the embodiment, the processing frequency adjustment unit can adjust the processing frequency of the GPU according to the utilization ratio of the CPU determined by the determination unit so as to control the transmission speed of image display data, and the resolution adjustment unit can adjust the resolution of the displayed images according to the processing frequency of the GPU adjusted by the processing frequency adjustment unit, so that the images are displayed in a different resolution when the display system is in a different operation mode, therefore, the dynamic power consumption of the GPU is reduced and the overall power consumption of the display system is also lowered.

In this embodiment, the working parameter of the CPU comprises a working frequency.

The display system of this embodiment may further comprise an acquisition unit used for acquiring the working parameter of the CPU. The acquisition unit is capable of intelligently acquiring the working parameter of the CPU without an operator's manual measurement, which makes the display system of the embodiment more intelligent.

The display system of this embodiment may further comprise a clock unit used for setting a dominant frequency (reference processing frequency) for the GPU. The existing display systems all comprise the clock unit, which, therefore, is not described in detail herein.

The display system of this embodiment may further comprise a display unit used for displaying images according to the resolution adjusted by the resolution adjustment unit, and the display unit comprises a display screen and other known devices used for image display.

The display system of the embodiment may be a mobile phone, a computer, a television or other display device.

It may be understood that the implementations as described above are merely exemplary implementations used for describing the principle of the present invention, but the present invention is not limited thereto. For a person of ordinary skill in the art, various variations and improvements can be made without departing from the spirit and essence of the present invention, and those variations and improvements shall also be regarded as falling into the protection scope of the present invention

The invention claimed is:

1. An image display method of an image display device, the image display method comprising:
    determining a utilization ratio of a CPU of the image display device according to a pre-acquired working parameter of the CPU;
    adjusting a processing frequency of a GPU of the image display device according to the determined utilization ratio of the CPU; and
    before acquiring the working parameter of the CPU, setting a dominant frequency for the GPU,
    wherein adjusting the processing frequency of the GPU according to the determined utilization ratio of the CPU comprises:
    determining an operation mode of the image display device according to the determined utilization ratio of the CPU, when the determined utilization ratio of the CPU is less than or equal to 30%, the image display device is determined in a static mode, adjusting the processing frequency of the GPU to be smaller than the dominant frequency;
    when the determined utilization ratio of the CPU is greater than or equal to 70%, the image display device is determined in a high speed processing mode, adjusting the processing frequency of the GPU to be larger than the dominant frequency; and
    when the determined utilization ratio of the CPU is between 30% and 70%, the image display device is determined in a mode between the static mode and the high speed processing mode, keeping the processing frequency of the GPU at the dominant frequency, wherein the CPU is configured to control operations of the image display device, and the GPU is configured to process data of images displayed by the image display device.

2. The image display method according to claim 1, wherein the working parameter of the CPU comprises a working frequency.

3. The image display method according to claim 1, further comprising adjusting a resolution of displayed images according to the adjusted processing frequency of the GPU so as to display images, wherein adjusting the resolution of the displayed images according to the adjusted processing frequency of the GPU comprises:
   when the processing frequency of the GPU equals to the dominant frequency, keeping the resolution of the displayed images at an initial resolution;
   when the processing frequency of the GPU is smaller than the dominant frequency, adjusting the resolution of the displayed images to be smaller than the initial resolution; and
   when the processing frequency of the GPU is larger than the dominant frequency, keeping the resolution of the displayed images at the initial resolution.

4. An image display device, configured to:
   determine a utilization ratio of a CPU of the image display device according to a pre-acquired working parameter of the CPU;
   adjust a processing frequency of a GPU of the image display device according to the determined utilization ratio of the CPU; and
   set a dominant frequency for the GPU,
   wherein
   the image display device is configured to determine an operation mode thereof according to the determined utilization ratio of the CPU, when the determined utilization ratio of the CPU is less than or equal to 30%, the image display device is determined in a static mode, and configured to adjust the processing frequency of the GPU to be smaller than the dominant frequency;
   when the determined utilization ratio of the CPU is greater than or equal to 70%, the image display device is determined in a high speed processing mode, and configured to adjust the processing frequency of the GPU to be larger than the dominant frequency; and
   when the determined utilization ratio of the CPU is between 30% and 70%, the image display device is determined in a mode between the static mode and the high speed processing mode, and configured to keep the processing frequency of the GPU at the dominant frequency,
   wherein the CPU is configured to control operations of the image display device, and the GPU is configured to process data of images to be displayed by the image display device.

5. The image display device according to claim 4, wherein the working parameter of the CPU comprises a working frequency.

6. The image display device according to claim 5, further configured to adjust a resolution of displayed images according to the adjusted processing frequency of the GPU, and display images according to the adjusted resolution, wherein
   the image display device is configured to keep the resolution of the displayed images at an initial resolution when the processing frequency of the GPU equals to a dominant frequency, adjust the resolution of the displayed images to be smaller than the initial resolution when the processing frequency of the GPU is smaller than the dominant frequency, and keep the resolution of the displayed images at the initial resolution when the processing frequency of the GPU is larger than the dominant frequency.

7. The image display device according to claim 4, further configured to adjust a resolution of displayed images according to the adjusted processing frequency of the GPU, and display images according to the adjusted resolution, wherein
   the image display device is configured to keep the resolution of the displayed images at an initial resolution when the processing frequency of the GPU equals to a dominant frequency, adjust the resolution of the displayed images to be smaller than the initial resolution when the processing frequency of the GPU is smaller than the dominant frequency, and keep the resolution of the displayed images at the initial resolution when the processing frequency of the GPU is larger than the dominant frequency.

* * * * *